US008444058B2

(12) United States Patent
Masin

(10) Patent No.: US 8,444,058 B2
(45) Date of Patent: May 21, 2013

(54) EMBEDDED RFID TAGS AND ASSOCIATED METHODS AND SYSTEMS

(75) Inventor: Joseph V. Masin, Santa Barbara, CA (US)

(73) Assignee: Trovan, Ltd. (GB)

( * ) Notice: Subject to any disclaimer, the term of this patent is extended or adjusted under 35 U.S.C. 154(b) by 42 days.

(21) Appl. No.: 13/010,243

(22) Filed: Jan. 20, 2011

(65) Prior Publication Data

US 2012/0187197 A1 Jul. 26, 2012

(51) Int. Cl.
*G06K 19/06* (2006.01)
*G06K 19/077* (2006.01)

(52) U.S. Cl.
CPC ............................... *G06K 19/07749* (2013.01)
USPC ............................ 235/492; 235/375; 235/487

(58) Field of Classification Search
CPC ............................................... G06K 19/07749
USPC .......................................... 235/375, 487, 492
See application file for complete search history.

(56) References Cited

U.S. PATENT DOCUMENTS

| | | | |
|---|---|---|---|
| 4,746,556 A | 5/1988 | Matsuguchi et al. | 428/40 |
| 5,867,102 A | 2/1999 | Souder et al. | 340/572 |
| 6,043,746 A | 3/2000 | Sorrells | 340/572.7 |
| 6,121,880 A | 9/2000 | Scott et al. | 340/572.5 |
| 6,262,692 B1 | 7/2001 | Babb | 343/895 |
| 6,421,013 B1 | 7/2002 | Chung | 343/700 |
| 6,888,509 B2 | 5/2005 | Atherton | 343/718 |
| 7,049,962 B2 | 5/2006 | Atherton et al. | 340/572.1 |
| 7,095,324 B2 | 8/2006 | Conwell et al. | 340/572.1 |
| 7,855,649 B2 | 12/2010 | Masin | 340/572.8 |
| 2001/0041551 A1* | 11/2001 | Rotzoll | 455/343 |
| 2006/0202824 A1 | 9/2006 | Carroll et al. | 340/568.1 |
| 2007/0029384 A1 | 2/2007 | Atherton | 235/435 |
| 2007/0247317 A1 | 10/2007 | Farrell | 340/572.8 |
| 2008/0016005 A1 | 1/2008 | Owen et al. | 705/73 |
| 2008/0110774 A1* | 5/2008 | Chisholm et al. | 206/216 |
| 2008/0186367 A1* | 8/2008 | Adkins et al. | 347/86 |
| 2009/0045963 A1 | 2/2009 | Vigneron et al. | 340/572.8 |
| 2009/0121877 A1 | 5/2009 | Henderson | 340/572.7 |
| 2009/0128340 A1* | 5/2009 | Masin | 340/572.9 |

OTHER PUBLICATIONS

U.S. Appl. No. 13/300,835, "*Gas Cylinder and RFID Transponder Assemblies and Related Methods Having Fixed Transponders Orientations*," filed Nov. 21, 2011.

* cited by examiner

*Primary Examiner* — Ahshik Kim
(74) *Attorney, Agent, or Firm* — O'Keefe, Egan, Peterman & Enders LLP

(57) ABSTRACT

Embedded RFID (radio frequency identification) tags for objects or containers and related systems and methods are disclosed that overcome problems existing with previous RFID tags. The RFID tags are embedded within recesses within the outer surfaces of objects or containers, such as within a metal valve flange for a metal container. The RFID tags can also be shaped and configured to fit within recesses so that the top surfaces of the RFID tags match the outer surfaces of the objects or containers. The embedded RFID tags can also be painted or otherwise disguised so that they are more difficult to identify. In addition, the RFID tags are preferably tamper resistant and can also use PSK (phase shift key) modulation. The embedded RFID tags described herein are particularly useful for tracking of liquid propane gas (LPG) containers and/or other types of containers or objects for holding hazardous materials.

24 Claims, 5 Drawing Sheets

EMBEDDED RFID TAGS AND ASSOCIATED METHODS AND SYSTEMS

TECHNICAL FIELD OF THE INVENTION

The present invention relates generally to miniature electronic devices and more particularly to miniature transponder devices suitable for assets management and other purposes.

BACKGROUND

Prior RFID (radio frequency identification) tags exist that are used to help track various products. RFID tags are typically an assembly including an RFID transponder coupled into a protective housing, and the assembly can then be used for assets management, container safety inspection purposes, fraud prevention, ownership identification or other purposes. One application for such RFID tags, for example, is the use of RFID tags to help track hazardous products, such as liquid propane gas (LPG) stored in metal containers or cylinders. One problem with existing RFID tags is that they are often easily visible with respect to their existence and location on a container. Once identified, attempts can be made to remove them. Once removed, the container can no longer be tracked, and the removed RFID tag can also be applied to different products. This identification, along with potential removal and re-use, causes a security risk that is undesirable.

SUMMARY OF THE INVENTION

Embedded RFID (radio frequency identification) tags for objects or containers and related systems and methods are disclosed that overcome problems existing with previous RFID tags. The RFID tags are embedded within recesses within the outer surfaces of the objects or containers, such as within a metal valve flange for a metal container. The RFID tags can also be shaped and configured to fit within the recesses so that the top surfaces of the RFID tags match the outer surfaces of the objects or containers. The embedded RFID tags can also be painted or otherwise disguised so that they are more difficult to identify thereby reducing the likelihood that attempts to remove them will occur. In addition, the RFID tags are preferably tamper resistant so that removal of an RFID tag, after it is attached, will destroy and/or render inoperable the RFID transponder within the RFID tag. The RFID tags can also use PSK (phase shift key) modulation to improve communication with readers where metal protection rings are used to protect valves. The embedded RFID tags described herein are particularly useful for tracking of liquid propane gas (LPG) containers and/or other types of containers or objects for holding hazardous materials. Other features and variations can be implemented, if desired, and related systems and methods can be utilized as well.

In one embodiment, an assembly having an embedded RFID tag is disclosed including an object having an outer surface, a recess formed within the outer surface of the object, and an RFID tag positioned within the recess and adhered to a bottom surface of the recess. In a further embodiment, the assembly includes the object is a container having an opening and configured to hold a material and a valve flange coupled within the opening of the container, where the recess is formed within an outer surface of the valve flange. In a still further embodiment, the recess and RFID tag are sized with respect to each other so that a top surface of the RFID tag is configured to match the outer surface of the valve flange.

In a further tamper resistant embodiment, the RFID tag for the assembly includes a housing having a bottom surface where the housing further includes a cavity within the bottom surface and one or more structures protruding from an inner wall of the cavity, an RFID transponder positioned within the cavity, and a potting element within the cavity where the potting element engages the RFID transponder and the one or more structures and where the potting element is a material that is weaker than the housing. Further, an adhesive is positioned between the bottom surface of the housing and the bottom surface of the recess to adhere the housing and the potting element to the bottom surface of the recess, the adhesive comprising a material that bonds more strongly to the bottom surface of the recess than to the housing, bonds more strongly to the bottom surface of the recess than to the potting element, and bonds more strongly to the potting element than the housing so that the potting element will tend to break rendering the RFID transponder inoperable if the housing is pried off. In further embodiments, the bottom surface of the recess is a metal material and the housing is a plastic material. In a still further embodiment, a strength of adhesion for the adhesive to the metal bottom surface of the recess and to the potting element is 100 pounds per square inch or more greater than a strength of adhesion for the adhesive to the to the plastic housing. Still further, the housing can be a ceramic material.

In other embodiments, the recess can be a recess formed by cutting out a shape within the outer surface of the valve flange. The recess can also be a recess within a molded form of the valve flange. Still further, the top surface of the RFID tag can be painted. In addition, the container can be a metal container configured to store liquid propane gas. In still further embodiments, at least one valve is coupled to the valve flange. In one further particular embodiment, two valves are coupled to the valve flange including a primary valve and a pressure relief valve.

In one embodiment, an assembly having an embedded RFID tag is disclosed including a container configured to hold a material and having an opening, a valve flange coupled within the opening of the container, at least one valve coupled to the valve flange, a metal ring coupled to the top of the container to provide protection for the at least one valve, and an RFID tag adhered to an external surface of the container or an external surface of the valve flange inside the metal ring where the RFID tag is configured to use phase shift key modulation when communicating information to an external reader. Tamper resistant embodiments can also be implemented for the assembly as described herein. Further, a recess can be formed within the valve flange, and the RFID tag can be adhered to a bottom external surface of the recess. Still further, the recess and RFID tag can be sized with respect to each other so that a top surface of the RFID tag is configured to match an outer surface of the valve flange.

In one embodiment, a method for forming an assembly having an embedded RFID tag including providing an object having an outer surface and having a recess formed within the outer surface of the object, and adhering an RFID tag to a bottom surface of the recess. In a further embodiment, the method includes providing a container having an opening and configured to hold a material, and providing a valve flange configured to be coupled within the opening for the container, the valve flange having the recess formed within its outer surface. In a still further embodiment, the recess and RFID tag are sized with respect to each other so that a top surface of the RFID tag is configured to match the outer surface of the valve flange. In a still further embodiment, the method includes coupling the valve flange to the container.

In a further tamper proof embodiment, the method further includes providing an RFID tag including a housing having a bottom surface where the housing further includes a cavity within the bottom surface and one or more structures protruding from an inner wall of the cavity, an RFID transponder positioned within the cavity, and a potting element within the cavity where the potting element engages the RFID transponder and the one or more structures and where the potting element is a material that is weaker than the housing. Further, the adhering step includes adhering the RFID tag using an adhesive is positioned between the bottom surface of the housing and the bottom surface of the recess to adhere the housing and the potting element to the bottom surface of the recess, the adhesive comprising a material that bonds more strongly to the bottom surface of the recess than to the housing, bonds more strongly to the bottom surface of the recess than to the potting element, and bonds more strongly to the potting element than the housing so that the potting element will tend to break rendering the RFID transponder inoperable if the housing is pried off. In a further embodiment, the bottom surface of the recess includes a metal material and the housing includes a plastic material. Still further, the method can include using an adhesive having a strength of adhesion for the adhesive to the metal bottom surface of the recess and to the potting element that is 100 pounds per square inch or more greater than a strength of adhesion for the adhesive to the to the plastic housing. Still further, the housing can be a ceramic material.

In further embodiments, the method includes forming the recess by cutting out a shape within the outer surface of the valve flange. In other embodiments, the recess is a recess within a molded form of the valve flange. Further, the method can include painting the top surface of the RFID tag. Still further, the object can be a metal container configured to store liquid propane gas. In addition, the method can include coupling the valve flange to the container and coupling at least one valve to the valve flange.

Other features and variations can be implemented, if desired, and related systems and methods can be utilized as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed for embedding RFID (radio frequency identification) tags within objects or containers that overcome problems existing with previous RFID tags. The RFID tags can be sized and configured so as to fit within recesses formed within objects or containers, such as within a metal valve flange for a metal cylinder. If desired, the embedded RFID tags can also be covered, painted and/or otherwise disguised to make them more difficult to identify. The RFID tags can also use PSK (phase shift key) modulation to improve communication with readers where metal protection rings are used to protect valves. The embedded RFID tags described herein are particularly useful for controlling and monitoring the distribution and use of hazardous materials in objects or containers.

The RFID tags are also preferably made to be tamper resistant. The tamper resistant RFID tag embodiments described herein help to prevent removal, re-use and/or possible switching of RIFD tags on objects or containers, such as metal cylinders used for carrying non-hazardous material or hazardous material, such as liquid propane gas (LPG). One feature of the tamper resistant embodiments is the use of adhesive materials with differing adhesion characteristics with respect to the container material (e.g., metal) and the housing for the RFID tag (e.g., plastic) so that the RFID tag will tend to be destroyed when removal is attempted.

Figure 1A:
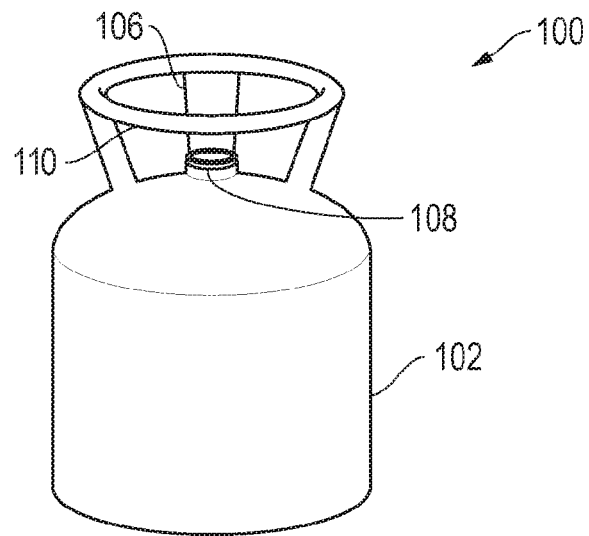
FIG. 1A is a diagram for a material container having a metal valve flange, such as a metal cylinder holding liquid propane gas (LPG).

FIG. 1A is a diagram for an embodiment 100 including a container 102 having an embedded RFID tag. The container 102 can be, for example, a metal cylinder holding LPG or other hazardous or non-hazardous material. A metal valve flange 108 is welded to the top of the cylinder 102. As described in more detail below, the metal valve flange 108 can be configured to provide an opening into which a valve can be inserted and coupled. For example, the opening can be threaded to allow a primary valve to be attached by screwing the valve into place. As also described further below, a second opening can also be provided in the metal valve flange into which a second valve can be inserted and coupled. For example, the second opening can also be threaded and provide a secondary access port into which an emergency pressure relief valve can screwed into place. Such a relief valve is a mandatory regulatory requirement in some geographic regions for certain containers, such as metal cylinders holding LPG in Brazil In addition, as depicted, one or more metal stay plates 106 can also be connected to the gas containing portion of the cylinder 102 and to a metal ring 110. The metal ring 110 can be used, for example, to protect valves coupled to a metal valve flange 108, and the metal ring can be used for picking up or moving the cylinder 102.

Figure 1B:
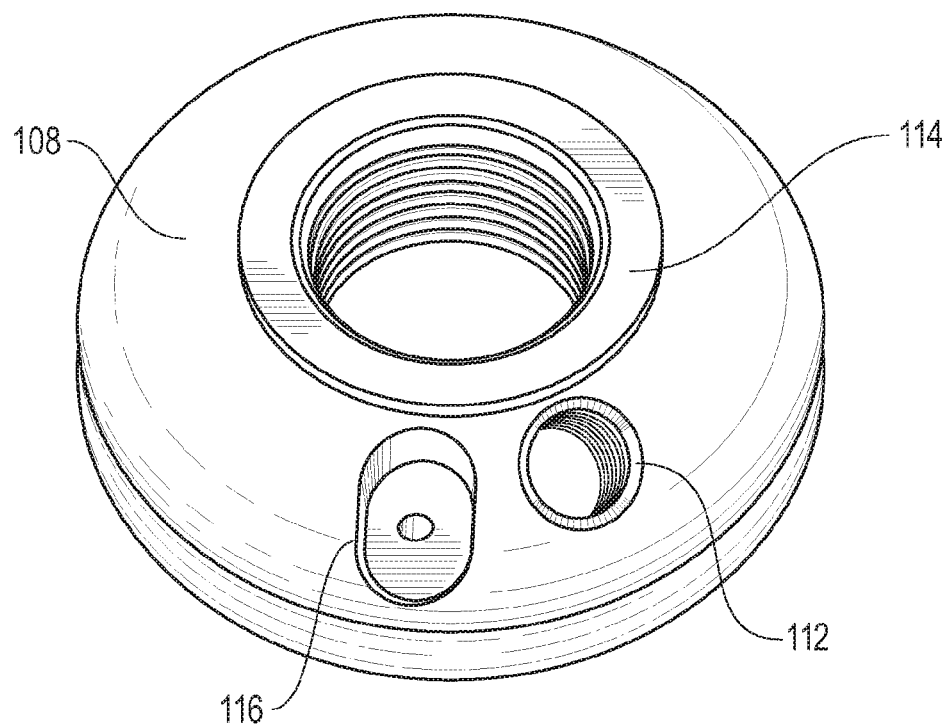
FIG. 1B is a diagram for a metal valve flange for the container of FIG. 1A having a recess sized so as to be capable of holding an RFID tag.

FIG. 1B is a diagram for a metal valve flange 108 for the metal container of FIG. 1A having a recess 116 sized so as to be capable of holding an RFID tag. The valve opening 114 is configured to receive a valve, such as a brass valve, which can be screwed into place. The secondary port opening 112 is also configured to receive a valve, such as a brass pressure relief valve, which can also be screwed into place.

Figure 1C:
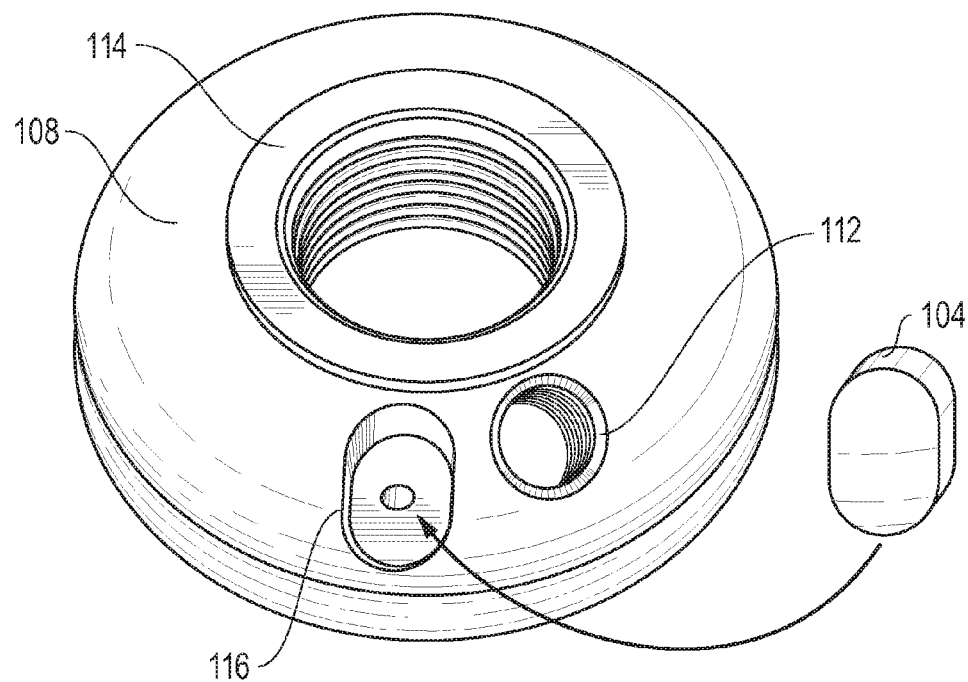
FIG. 1C is a diagram of the metal valve flange for the container of FIG. 1A showing that an RFID tag can be inserted and adhered within the recess shown in FIG. 1B.

FIG. 1C is a diagram for a metal valve flange 108 for the container 102 showing that an RFID tag 104 can be inserted within the recess 116 shown in FIG. 1B. The RFID tag 104 can also be adhered to the bottom surface of the recess 116 using an adhesive, as described in more detail below. Preferably, the RFID tag 104 and the recess 116 are configured and sized with respect to each other so that the RFID tag 104 fits flush within the recess 116 and so that the top surface of the RFID tag 104 matches the outer surface of the valve flange 108.

The recess 116 can have a bottom surface and one or more edge surfaces extending below the outer surface of the metal valve flange 108. The shape of the edge surfaces and bottom surface will depend upon the shape selected for the recess 116, which is preferably formed to match the size of an RFID tag 104. Alternatively, the RFID tag 104 can be shaped and configured to match the size of the recess 116. The RFID tag can then be inserted into the recess 116 and adhered to the bottom surface of a recess 116. Once the RFID tag has been adhered within the recess 116, the RFID tag can be painted or otherwise disguised to make identification or location of the RFID more difficult to determine. After the adhering process, the RFID tag 104 is effectively embedded within the surface of the metal flange 108.

As depicted for this embodiment, the RFID tag 104 is embedded within the metal valve flange 108 for the container 102, such as a metal LPG container. Other locations for the recess 116 and the RFID tag 104 could also be used, as desired. It is further noted that the container 102 and/or valve flange 108 could be any desired object into which it is desired to embed an RFID tag 104. It is also noted that the surface within which the RFID tag 104 is embedded can be any desired material, including a metal surface.

It is noted that the shape for the recess 116 can be sized with respect to RFID tag 104 so as to provide a large enough space so that the RFID tag 104 can be completely embedded within the outer surface of the object. For example, one RFID tag 104 that can be used includes a plastic housing having an oval opening approximately 12 mm long by 3 mm wide by 4 mm deep (e.g., 12×3×4 mm). A transponder is fitted into and secured within the oval opening. This structure for an RFID tag is described in more detail below with respect to FIGS. 2-5. For this RFID tag embodiment, the recess 116 can also be generally oval in shape and can be approximately 16 mm long by 8 mm wide by 4.5 mm deep (e.g., 16×8×4.5 mm) to match the outer dimensions of the plastic housing for the RFID tag 104. It is further noted that it may be desirable to provide some space between the electronics within the RFID tag 104 and the edges of the recess 116, particularly where the edges of the recess 116 are metal, in order to diminish interference of metals with the magnetic field and operation of the transponder within the RFID tag 104. It is also noted that RFID tags 104 having other shapes and sizes can also be used, if desired, and the recess 116 can be shaped and sized accordingly, as desired.

One technique for forming the recess 116 is to use a drill, router or other tool capable of cutting the material from which the object or container is made. This cutting tool can be used to cut out the desired shape of the recess within the surface of the object. For example, if the container or object is metal, a router having a bit capable of cutting metal can be used to cut out the desired shape. Another technique that could be used to form the recess 116 is to mold the object or container with a recess 116 so that a recess 116 already exists within the molded form of the object or container and does not need to be cut out of the surface. Other techniques for forming the recess 116 could also be used, as desired.

Figure 1D:
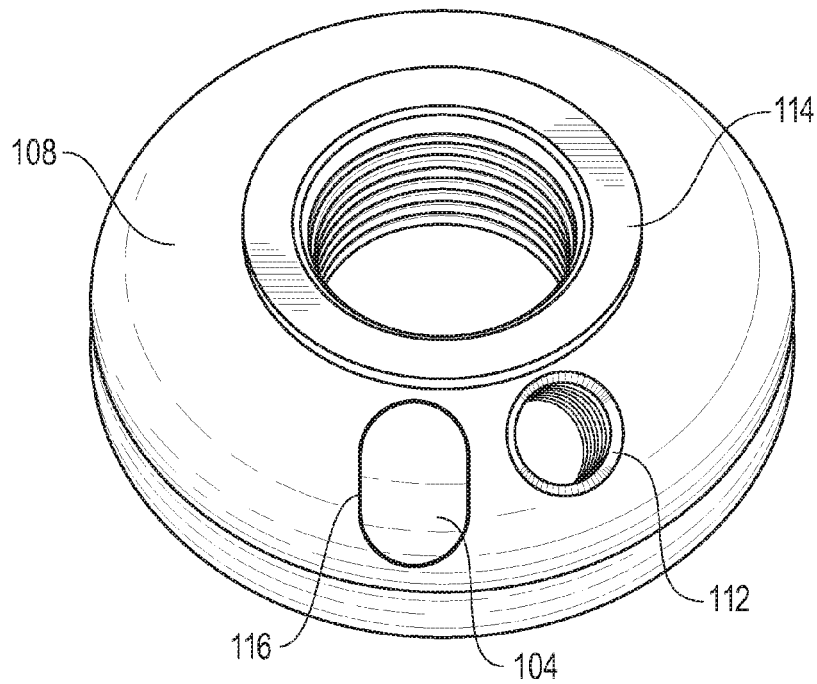
FIG. 1D is a diagram of the metal valve flange for the container of FIG. 1A having an embedded RFID tag.

FIG. 1D is a diagram of the valve flange 108 for the metal container 102 of FIG. 1A including an RFID tag 104 adhered within recess 116 so that it is effectively embedded within the valve flange 108. Also, as described above, the top surface of the RFID tag 104 can be painted and/or otherwise disguised, if desired. And the RFID tag can be shaped to match the outer surface of the valve flange 108.

It is further noted that when a metal ring 110 is used to protect valves with respect to a container 102, the metal ring 110 can interfere with RF signals being communicated to and from an RFID tag 104 adhered to the container 102 within the metal ring 110. For such circumstances, it is preferable to utilize PSK (phase shift key) modulation for the RF signals being used to communicate information to and/or from the RFID tag 104. For example, when PSK modulation is used by the RFID tag 104, increased communication range is achieved with respect to a reader that is reading information from the RFID tag 104, as compared to implementations where FSK (frequency shift key) modulation or ASK (amplitude shift key) modulation is being used. As such, using PSK modulation with respect to the RFID tag 104 is preferable in these embodiments where a protective metal ring 110 is used. Still further it is noted that rather then being adhered to the bottom surface of the recess 116, the RFID tag may also be adhered to the external surface of the object, such as to the external surface of the container 102 or the external surface of the valve flange 108.

Figure 2:
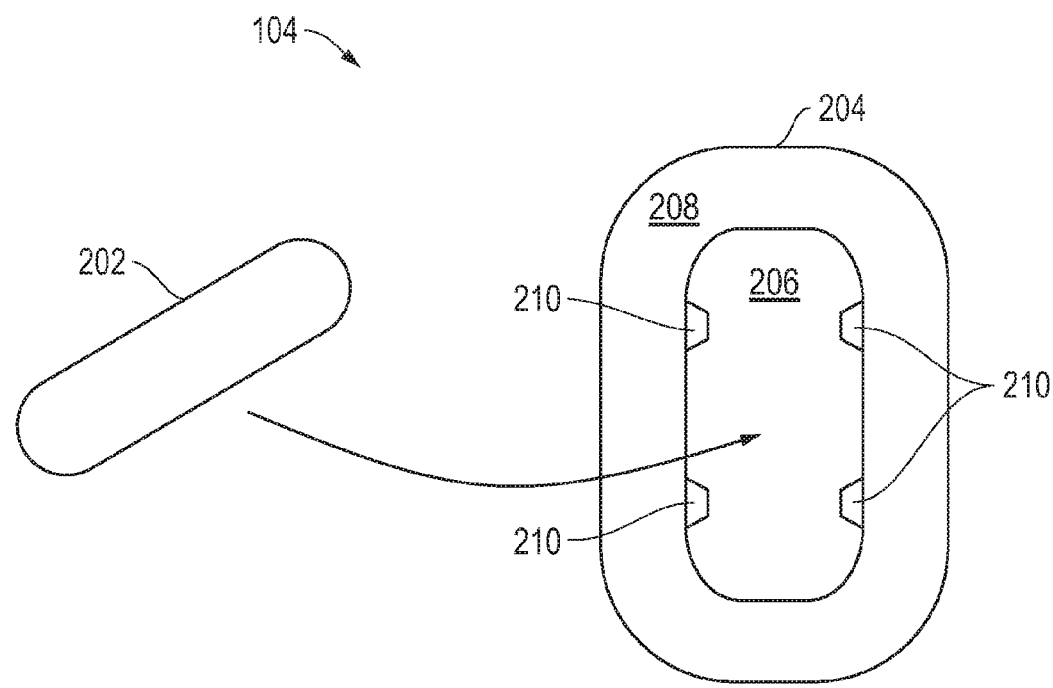
FIG. 2 is a diagram for an RFID tag assembly including a transponder and a housing for the transponder.

FIG. 2 is a diagram for an RFID tag 104 including an assembly of an RFID transponder 202 and a housing 204 for the transponder. The bottom surface 208 of the housing 204 is adhered to bottom surface of the recess 116 on the container 102. The housing 204 includes a space 206 in which the transponder 202 can be seated. If desired, wedges 210 can be formed on the walls of the space 206 help to keep the transponder 202 in place and to help damage the transponder 202 upon an attempted removal, as further described below. A potting element, as described further below, can be added to the space 206 after the transponder 202 is inserted to secure the transponder 202 in place. As also described further herein, an adhesive is used to secure the RFID tag 104 to the container 102.

Figure 3:
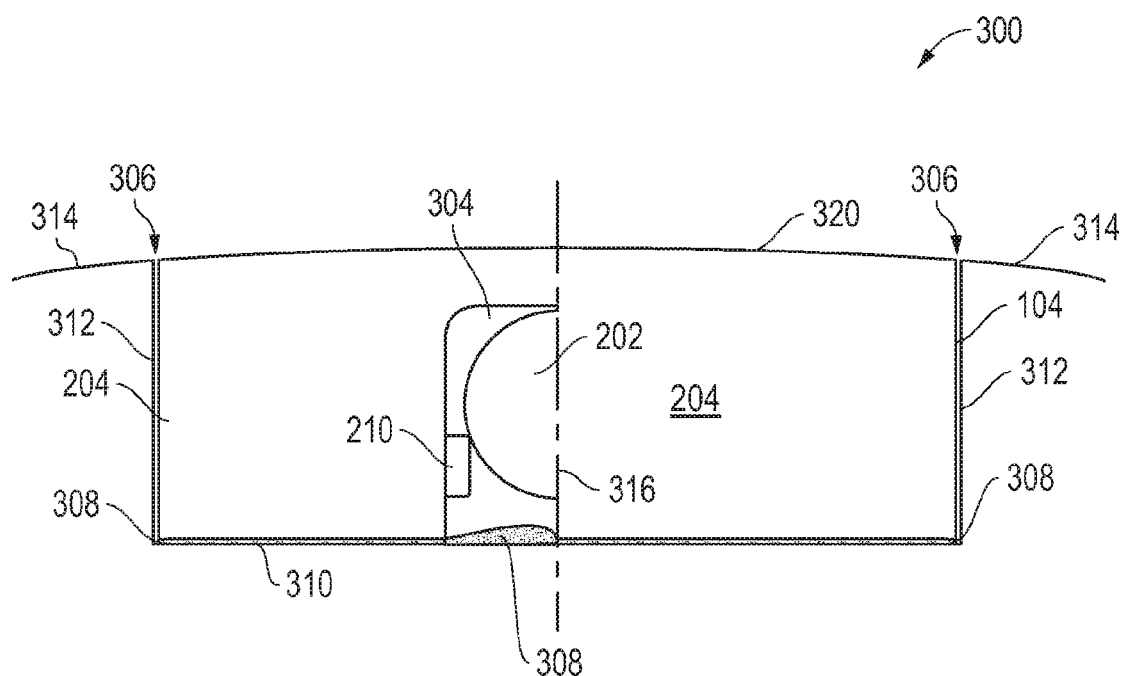
FIG. 3 is a cut-away end view of the RFID tag of FIG. 2 adhered within a recess on an object or container, such as within a metal valve flange for a metal cylinder.

FIG. 3 is a cut-away end view 300 of the RFID tag 104 installed in the recess 116 of an object, such as a metal valve flange 108 for a metal cylinder 102. As depicted, the left side of the plastic housing 204 is cut away along line 316 to reveal the potting element 304, a wedge 210, and the transponder 202. The bottom surface 310 of the recess 116 is shown at the bottom of FIG. 3, and the sides 312 of the recess 116 are also shown. Adhesive 308 couples the potting element 304 to the surface 310. Adhesive 308 also couples the plastic housing 204 to the surface 310. The transponder 202 is coupled into the housing 204 using the potting element 304. The wedge 210 is adjacent and preferably touching the transponder 202. In this way, the RFID tag 104, including the transponder 202, is coupled to the bottom surface 310 of the recess 116. It is noted that the gaps 306 between the edge of the RFID tag 104 and the side surfaces 312 for the recess 116 can be made as small as practical, if desired.

As described above, the RFID tag 104 and the recess 116 can be configured and sized so that they match each other. Further, the RFID tag 104 and the recess 116 can be configured and sized so that the top surface 320 of the RFID tag 104 is generally aligned or matches the external outer surface of the object, such as the top surface 314 of the metal valve flange 108. As also described above, the top surface 320 of the RFID tag 116 can also be painted and/or otherwise disguised so that the existence and location of the RFID tag 104 is less obvious or preferably totally concealed.

Figure 4:
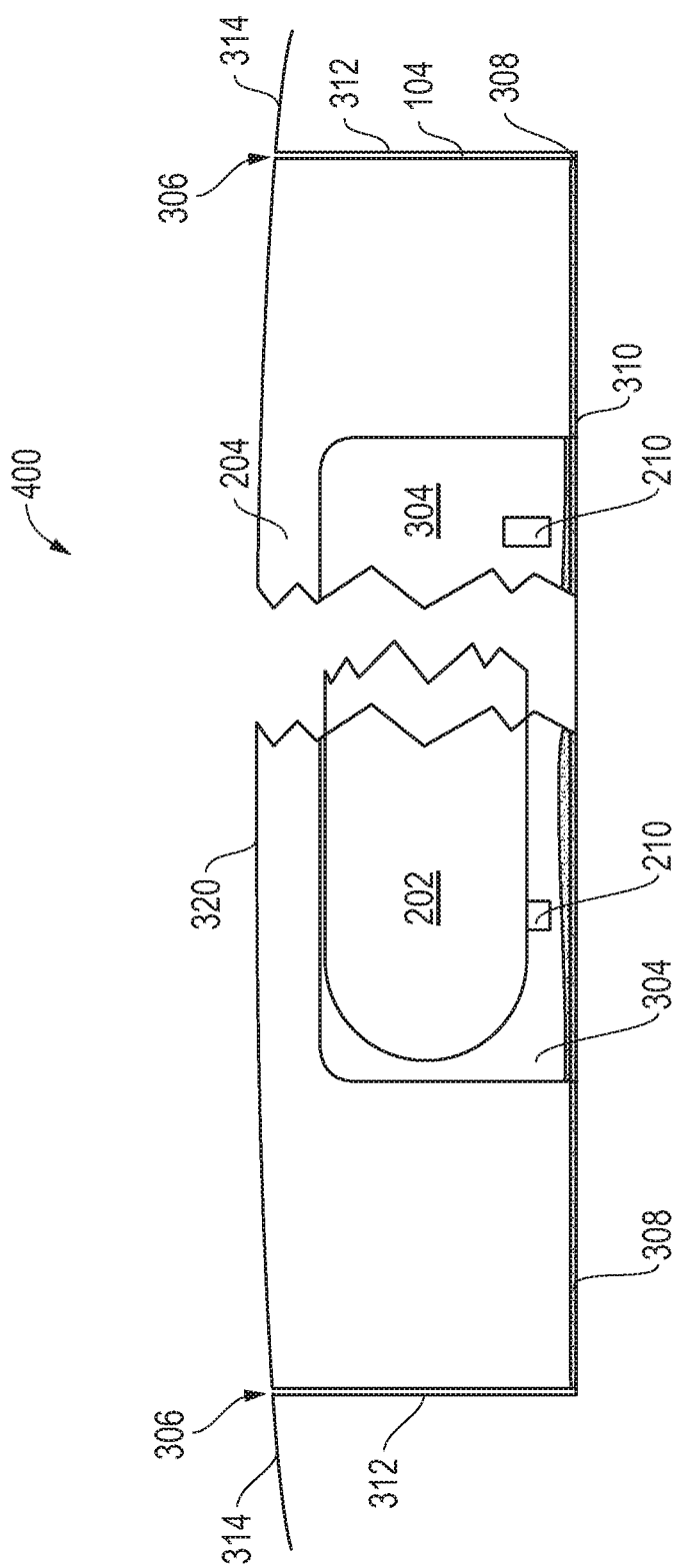
FIG. 4 is a side view of the RFID tag of FIG. 2 adhered within a recess on an object or container, such as within a metal valve flange for a metal cylinder.

FIG. 4 is a side view 400 of the RFID tag 104 embedded within the surface of an object. In particular, for embodiment 400, the RFID tag 104 is adhered to the bottom surface 310 of a recess 116 for a metal valve flange 108 for a container 102.

In this view, the left side of the drawing includes the transponder 202, and the right side is shown without the transponder 202. Again, the adhesive 308 couples the potting element 304 and the plastic housing 204 to the surface 310. The transponder 202 is again coupled to the plastic housing 204 using potting element 304. Wedges 210 again are adjacent and preferably touching the transponder 202.

Figure 5:
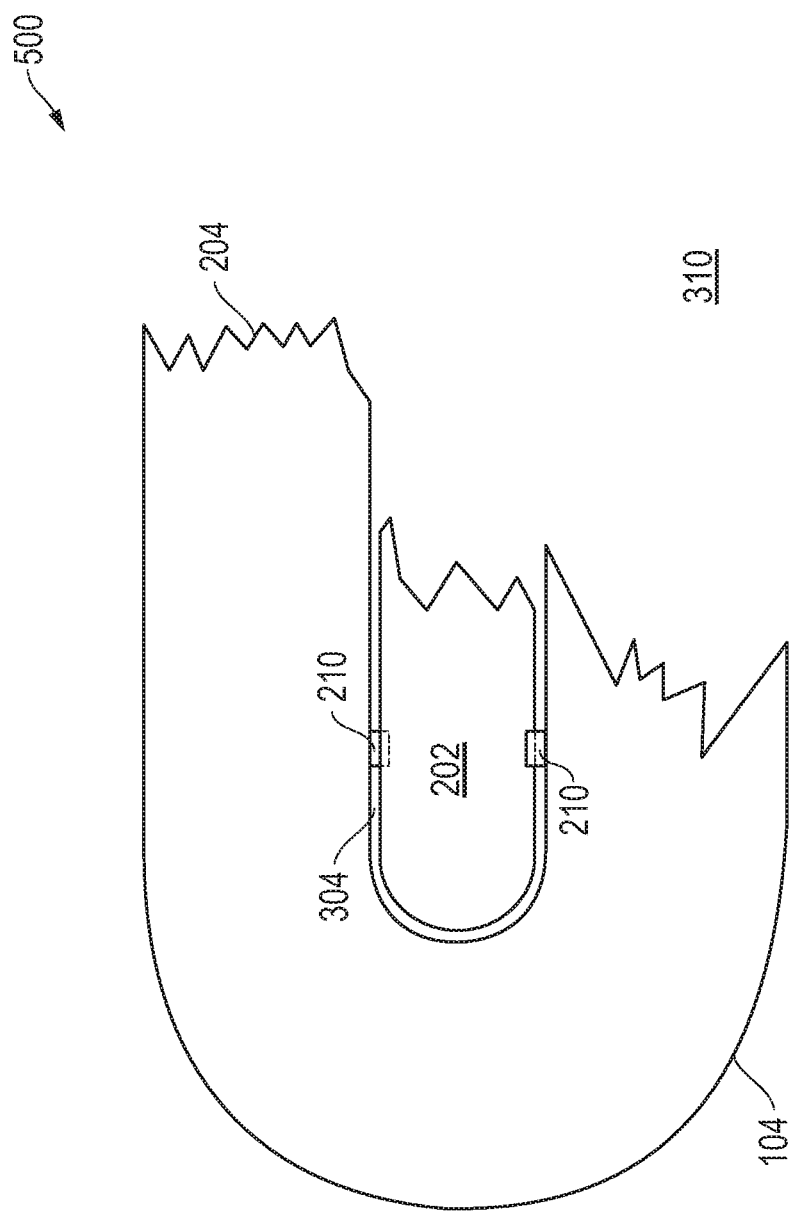
FIG. 5. is a bottom view of the RFID tag of FIG. 2 adhered within a recess on an object or container, such as within a metal valve flange for a metal cylinder.

FIG. 5. is a bottom view 500 of the RFID tag 104 adhered to the bottom surface 310 of the recess 116. In this view, the surface 310 has been mostly removed and a cut away so that the transponder 202 is shown. The transponder 202 is coupled to the housing 204 using the potting element 304. Wedges 210 are also shown adjacent and preferably touching the transponder 202. The plastic housing 204 surrounds the potting element 304 and the transponder 202. The plastic housing 204 and the potting element 304 are again both coupled to the surface 310 using adhesive 308.

It is noted that the metal valve flange 108, including the bottom surface 310 of the recess 116, may be made from a common metal used for containers, such as stainless steel or aluminum. It is also noted that the recess 116 can be formed within any desired object for which it is desired to embed the RFID tag 104.

It is also noted that the plastic housing 204 may be made from ABS plastic. ABS (Acrylonitrile Butadiene Styrene) plastic is a terpolymer of acrylonitrile, butadiene and styrene. Usual compositions are about half styrene with the balance divided between butadiene and acrylonitrile. Considerable variation is, of course, possible resulting in many different grades of ABS with a wide range of features and applications. In addition, many blends with other materials such as polyvinylchloride, polycarbonates and polysulfones have been developed. Acrylonitrile butadiene styrene materials can be processed by any of the standard thermoplastic processing methods. Ceramic materials may also be used if desired, particularly those without magnetic properties.

As discussed above, it is desirable to have the RFID tag 104 be destroyed and/or rendered inoperative when it is removed, and/or an attempt is made to remove it, from the recess 116 for the container 102 to which it is attached. One such application in which this tamper resistant result is desired is where the RFID tags 104 are used to track hazardous materials, such as LPG stored in metal cylinders.

One feature to the tamper resistant RFID tag embodiments described herein is that materials utilized have differing connection strengths with respect to metal as opposed to plastic or ceramics. This difference in connection strength makes it extremely difficult if not impossible for the RFID tag to be removed without destroying it and/or rendering inoperative the RFID transponder.

Example Materials and Construction for Tamper Proof Embodiments

As described above, the RFID transponder 202, either in glass encapsulated form or in non-encapsulated form, is enclosed within a plastic housing 204. An ABS plastic material can be used for the plastic housing 204. The space 206 in the housing 204 into which the transponder 202 is inserted is closed with a liquid potting material 304. The liquid potting material 304 is selected to have a consistency and strength, after hardening, that is less than the overall strength of the ABS plastic housing 204. For example, where ABS plastic is used for the housing 204, a two-part unfilled electronic grade epoxy encapsulant, such as EP 1121 (black) available from Ellsworth Adhesives, can be used for the potting element 304. The completed assembly for the RFID tag 104 is then attached to the metal surface 310 by adhesive 308. The adhesive 308 is selected so as to have desirable adhesive properties. Once constructed and attached, the RFID tag and the properties of materials used herein work together in sequence to achieve an attached RFID tag that is difficult or impossible to remove without destroying the RFID tag and/or rendering it inoperable.

Transponder

The transponder 202 can have an antenna made of copper wire (e.g., 5-15 microns thickness) that is wound around a ferrite core and connected to an RFID integrated circuit. This connection can be made directly to the gold bumps on an RFID integrated circuit, through a compression bonding process, or via a substrate which may include additional components such as storage and/or tuning capacitors. The transponder 202 can be encapsulated in glass for additional protection against outside elements over a long time periods. Alternatively, the transponder 202 can be used without protective glass encapsulation.

Housing

The housing 204, if desired, can be made of non-magnetic materials permitting operation of low frequency (e.g., 100-400 kHz) RFID devices, such as plastics, ceramics and glass. Plastic materials, such as plastic and ABS plastic, permit some flexibility. Ceramics and glass materials may also be utilized, but are more brittle. A cavity or space 206 is formed within the housing 204, and this space 206 is configured to receive the transponder 202. If desired, the housing 204 can also have two or more wedges 210 protruding from the walls into the transponder cavity or space 206, if desired. These wedges can help position the transponder 202 and can help destroy it and/or help render it inoperable when the RFID tag 104 is removed. Instead of or in addition to the wedges 210, other structures could also be formed and used that protrude into the potting element 304 to help position the transponder 202 and/or render it inoperable when the RFID tag 104 is attempted to be removed. In addition, to make the housing 204 more difficult to pry off, the housing 204 for the RFID tag 104 can be shaped with rounded edges and a low profile (e.g., less than about 4-4.5 mm high).

Potting Element

The potting element 304 can be an epoxy, plastic, or other material, capable of being introduced into the housing transponder cavity or space 206 to hold or secure the transponder 202. For example, the potting element 304 can be a material that can be injected in liquid form and that will then harden or cure over time. As described further below, the potting element 304 is preferably a material being weaker than the housing 204 so that the wedges 210 can break the potting element 304 when the housing 204 begins to separate from the potting element 304 when the RFID tag 104 is being pried off the surface of a metal surface 310. As indicated above, a two-part unfilled electronic grade epoxy encapsulant, such as EP 1121 (black) available from Ellsworth Adhesives, can be used for the potting element 304.

Adhesive

Adhesive 308 can be an adhesive that bonds more strongly to metal than it does to the material used for the housing 204 or for the potting element 304. When using plastic for the housing 204, such as ABS plastic, adhesives such as 3M products Scotch-Weld DP810, DP125 and/or DP420 or similar adhesives can be utilized for the adhesive 308.

Plastic Housing Embodiments

For a plastic solution for the housing 204, one key to the success of the tamper proof RFID tag embodiments described herein is the use of an adhesive 308 to attach the RFID tag 104 to metal surface 310 that will adhere more (and preferably significantly more) to the metal than to the ABS plastic and that will adhere to the potting element 304 more (and preferably significantly more) than to the ABS plastic. One example of such an adhesive is DP420 from 3M Company which has a sheer strength of about 1900 PSI (pounds per square inch) with metal but a peel strength of about 900 PSI to ABS plastic. In addition, this adhesive will adhere to the potting element 304 more than to the ABS plastic. It is further noted that it is desirable that the strength for adhesion of the adhesive 308 to the metal surface 310 and to the potting element 304 be about 100 PSI or more than the strength of adhesion to the plastic housing 204.

When someone attempts to pry the RFID tag 204 off of the metal surface 310, the tag will either be crushed and/or, if lifted, partially bent, thereby destroying the electronic transponder assembly, including its glass encapsulation. Should the RFID tag 204 be completely pulled off the metal surface 310, the potting element 304 will stick to the adhesive better than to the plastic housing 204, and the potting element 304 would be pulled out of the housing cavity 206 together with the remnants of the electronic assembly. Within the transponder 202, the ultra thin antenna wires would be severed from the integrated circuit, and if a substrate were used, the substrate would be detached.

The wedges 210 on the sides of the cavity 206 can be used to assist in the breakage of the hardened potting element 304 and of the transponder 202 when being pulled out. In other words, because the wedges 210 are embedded a distance into the potting element 304, the wedges 210 will tend to pull on the potting element 304 as the RFID tag 104 is being pried off the metal surface 310. Because the adhesive 308 is adhered more strongly to the potting element 304 and the metal surface 310, the housing 204 will tend to separate from the potting element 304 as the RFID tag 104 is being pried off. As the pressure of this separation grows, the potting element 304 will tend to be broken by the force of the wedges 210 being pulled out with the housing 204.

Ceramic Housing Embodiments

For a ceramic solution for the housing 204, one key to the success of the tamper proof RFID tag embodiments described herein is again the very high degree of the adhesion of the glue or adhesive to the metal and also to the ceramics or glass. In this case, any attempt to remove will result in shattering of the housing 204 and resulting irreversible damage to the electronic assembly (e.g., destruction of ultra thin connection wires).

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An assembly having an embedded RFID tag, comprising:
    a metal container having an opening and configured to hold a material;
    a metal valve flange coupled within the opening of the container;
    a recess formed within an outer surface of the metal valve flange; and
    an RFID tag positioned within the recess and adhered to the bottom surface of the recess;
    wherein the recess and RFID tag are sized with respect to each other so that a top surface of the RFID tag is configured to match the outer surface of the valve flange so that the RFID tag is effectively embedded within the valve flange.

2. The assembly of claim 1,
    wherein the RFID tag comprises:
        a housing having a bottom surface, the housing further comprising a cavity within the bottom surface and one or more structures protruding from an inner wall of the cavity;
        an RFID transponder positioned within the cavity; and
        a potting element within the cavity, the potting element engaging the RFID transponder and the one or more structures, the potting element comprising a material that is weaker than the housing; and
    wherein an adhesive is positioned between the bottom surface of the housing and the bottom surface of the recess to adhere the housing and the potting element to the bottom surface of the recess, the adhesive comprising a material that bonds more strongly to the bottom surface of the recess than to the housing, bonds more strongly to the bottom surface of the recess than to the potting element, and bonds more strongly to the potting element than the housing so that the potting element will tend to break rendering the RFID transponder inoperable if the housing is pried off.

3. The assembly of claim 2, wherein the housing comprises a plastic material.

4. The assembly of claim 3, wherein a strength of adhesion for the adhesive to the metal bottom surface of the recess and to the potting element is 100 pounds per square inch or more greater than a strength of adhesion for the adhesive to the to the plastic housing.

5. The assembly of claim 2, wherein the housing comprises a ceramic material.

6. The assembly of claim 1, wherein the recess comprises a recess formed by cutting out a shape within the outer surface of the valve flange.

7. The assembly of claim 1, wherein the recess comprises a recess within a molded form of the valve flange.

8. The assembly of claim 1, wherein the top surface of the RFID tag is painted.

9. The assembly of claim 1, wherein the metal container is configured to store liquid propane gas.

10. The assembly of claim 1, wherein at least one valve is coupled to the valve flange.

11. The assembly of claim 10, wherein two valves are coupled to the valve flange, the two valves being a primary valve and a pressure relief valve.

12. An assembly having an embedded RFID tag, comprising:
    a metal container configured to hold a material and having an opening;
    a metal valve flange coupled within the opening of the container;

a recess formed within an outer surface of the metal valve flange;

at least one valve coupled to the valve flange;

a metal ring coupled to the top of the container to provide protection for the at least one valve; and an RFID tag adhered to a bottom external surface of the recess within the metal valve flange inside the metal ring, the RFID tag being configured to use phase shift key modulation when communicating information to an external reader;

wherein the recess and RFID tag are sized with respect to each other so that a top surface of the RFID tag is configured to match the outer surface of the valve flange so that the RFID tag is effectively embedded within the valve flange.

13. The assembly of claim 12, wherein the RFID tag comprises:

a housing having a bottom surface, the housing further comprising a cavity within the bottom surface and one or more structures protruding from an inner wall of the cavity;

an RFID transponder positioned within the cavity; and a potting element within the cavity, the potting element engaging the RFID transponder and the one or more structures, the potting element comprising a material that is weaker than the housing; and wherein an adhesive is positioned between the bottom surface of the housing and the external surface to adhere the housing and the potting element to the external surface, the adhesive comprising a material that bonds more strongly to the external surface than to the housing, bonds more strongly to the external surface than to the potting element, and bonds more strongly to the potting element than the housing so that the potting element will tend to break rendering the RFID transponder inoperable if the housing is pried off.

14. A method for forming an assembly having an embedded RFID tag, comprising:

providing a metal container having an opening and configured to hold a material;

providing a metal valve flange configured to be coupled within the opening for the container, the metal valve flange having a recess formed within its outer surface; and adhering an RFID tag to a bottom surface of the recess;

wherein the recess and RFID tag are sized with respect to each other so that a top surface of the RFID tag is configured to match the outer surface of the valve flange so that the RFID tag is effectively embedded within the valve flange.

15. The method of claim 14, further comprising coupling the valve flange to the container.

16. The method of claim 14, further comprising:

providing an RFID tag, comprising:

a housing having a bottom surface, the housing further comprising a cavity within the bottom surface and one or more structures protruding from an inner wall of the cavity;

an RFID transponder positioned within the cavity;

a potting element within the cavity, the potting element engaging the RFID transponder and the one or more structures, the potting element comprising a material that is weaker than the housing; and wherein the adhering step comprises adhering the RFID tag using an adhesive positioned between the bottom surface of the housing and the bottom surface of the recess to adhere the housing and the potting element to the bottom surface of the recess, the adhesive comprising a material that bonds more strongly to the bottom surface of the recess than to the housing, bonds more strongly to the bottom surface of the recess than to the potting element, and bonds more strongly to the potting element than the housing so that the potting element will tend to break rendering the RFID transponder inoperable if the housing is pried off.

17. The method of claim 16, wherein the housing comprises a plastic material.

18. The method of claim 17, further comprising using an adhesive having a strength of adhesion for the adhesive to the metal bottom surface of the recess and to the potting element that is 100 pounds per square inch or more greater than a strength of adhesion for the adhesive to the to the plastic housing.

19. The method of claim 16, wherein the housing comprises a ceramic material.

20. The method of claim 14, further comprising forming the recess by cutting out a shape within the outer surface of the valve flange.

21. The method of claim 14, wherein the recess comprises a recess within a molded form of the valve flange.

22. The method of claim 14, further comprising painting the top surface of the RFID tag.

23. The method of claim 14, wherein the metal container is configured to store liquid propane gas.

24. The method of claim 14, further comprising coupling the valve flange to the container and coupling at least one valve to the valve flange.

* * * * *